(12) United States Patent
Ching et al.

(10) Patent No.: US 10,920,994 B2
(45) Date of Patent: Feb. 16, 2021

(54) HEATED FLOOR PANELS

(71) Applicant: Goodrich Corporation, Charlotte, NC (US)

(72) Inventors: Nathaniel Ching, Hartville, OH (US); Jin Hu, Hudson Village, OH (US); Casey Slane, Tallmadge, OH (US)

(73) Assignee: Goodrich Corporation, Charlotte, NC (US)

(*) Notice: Subject to any disclaimer, the term of this patent is extended or adjusted under 35 U.S.C. 154(b) by 262 days.

(21) Appl. No.: 16/026,336

(22) Filed: Jul. 3, 2018

(65) Prior Publication Data

US 2020/0011542 A1 Jan. 9, 2020

(51) Int. Cl.
| | | |
|---|---|---|
| *H05B 3/20* | (2006.01) | |
| *H05B 3/28* | (2006.01) | |
| *F24D 13/02* | (2006.01) | |
| *H05B 3/14* | (2006.01) | |
| *B32B 3/12* | (2006.01) | |
| *B32B 5/18* | (2006.01) | |

(52) U.S. Cl.
CPC ........... *F24D 13/024* (2013.01); *H05B 3/145* (2013.01); *B32B 3/12* (2013.01); *B32B 5/18* (2013.01); *B32B 2260/021* (2013.01); *B32B 2262/106* (2013.01); *B32B 2307/204* (2013.01); *B32B 2398/10* (2013.01); *B32B 2398/20* (2013.01); *B32B 2605/18* (2013.01); *H05B 2203/02* (2013.01); *H05B 2203/026* (2013.01)

(58) Field of Classification Search
CPC ............ H05B 2203/026; H05B 1/0236; H05B 3/20–267; H05B 3/28–30
See application file for complete search history.

(56) References Cited

U.S. PATENT DOCUMENTS

| | | |
|---|---|---|
| 545,174 A | 8/1895 | Roadhouse |
| 554,773 A | 2/1896 | Cook |
| 580,679 A | 4/1897 | Davenport |
| 6,429,157 B1 | 8/2002 | Kishi et al. |

(Continued)

FOREIGN PATENT DOCUMENTS

| | | |
|---|---|---|
| EP | 1638371 A1 | 3/2006 |
| EP | 2113456 A2 | 11/2009 |

(Continued)

OTHER PUBLICATIONS

Extended European Search Report dated Oct. 31, 2019, issued during the prosecution of corresponding European Patent Application No. EP 19183864.8.

(Continued)

*Primary Examiner* — Michael A Laflame, Jr.
(74) *Attorney, Agent, or Firm* — Locke Lord LLP; Joshua L. Jones; Scott D. Wofsy

(57) ABSTRACT

A heater panel includes a core and a heater/dielectric layer including a positive thermal coefficient (PTC) heater layer between a pair of dielectric layers. A structural facing is included, wherein the heater/dielectric layer is bonded directly between the core and the structural facing. A second structural facing can be bonded to the core opposite the heater/dielectric layer. An impact layer can be bonded to the structural facing, e.g., the first structural facing described above, opposite the heater/dielectric layer.

13 Claims, 2 Drawing Sheets

(56) References Cited

U.S. PATENT DOCUMENTS

| | | |
|---|---|---|
| 6,519,835 B1 | 2/2003 | Von Arx et al. |
| 6,611,659 B2 | 8/2003 | Meisiek |
| 6,825,137 B2 | 11/2004 | Fu et al. |
| 6,834,159 B1 | 12/2004 | Schramm |
| 7,087,296 B2 | 8/2006 | Porter |
| 7,247,822 B2 | 7/2007 | Johnston |
| 7,800,028 B2 | 9/2010 | Wang |
| 8,158,245 B2 | 4/2012 | Pratte et al. |
| 8,286,919 B2 | 10/2012 | Gerken et al. |
| 8,523,113 B2 | 9/2013 | Atkinson |
| 8,752,279 B2 | 6/2014 | Brittingham et al. |
| 8,772,676 B2 | 7/2014 | Augustine et al. |
| 9,161,393 B2 | 10/2015 | Kaiserman et al. |
| 9,427,940 B2 | 8/2016 | Bremmer et al. |
| 9,493,894 B2 | 11/2016 | Butler et al. |
| 9,550,330 B2 | 1/2017 | Pratte et al. |
| 9,593,917 B2 | 3/2017 | Pilpel |
| 9,630,701 B2 | 4/2017 | Hu |
| 9,736,888 B2 | 8/2017 | Duce et al. |
| 9,782,944 B2 | 10/2017 | Martin et al. |
| 9,855,721 B2 | 1/2018 | Drexler et al. |
| 9,914,522 B2 | 3/2018 | Nehring |
| 9,939,087 B2 | 4/2018 | Kolarski et al. |
| 2006/0138279 A1 | 6/2006 | Pisarski |
| 2008/0210820 A1 | 9/2008 | Boeing |
| 2009/0011210 A1 | 1/2009 | Gao et al. |
| 2009/0236327 A1 | 9/2009 | Everly et al. |
| 2009/0266810 A1* | 10/2009 | Chivers ............... F24D 13/024 219/542 |
| 2012/0234819 A1 | 9/2012 | Berger |
| 2014/0044914 A1 | 2/2014 | Kurtz et al. |
| 2014/0071216 A1 | 3/2014 | Hu et al. |
| 2016/0007474 A1 | 1/2016 | Dardona et al. |
| 2016/0121993 A1* | 5/2016 | Nehring ................ B64C 1/40 244/118.5 |
| 2016/0297509 A1 | 10/2016 | Estadieu et al. |
| 2016/0340020 A1 | 11/2016 | Owens et al. |
| 2016/0361889 A1 | 12/2016 | Bartolome |
| 2017/0050395 A1 | 2/2017 | Vos et al. |
| 2017/0158898 A1 | 6/2017 | Xiao et al. |
| 2017/0238369 A1 | 8/2017 | Owens et al. |
| 2017/0254065 A1 | 9/2017 | Hegenbart et al. |
| 2018/0050523 A1 | 2/2018 | Pilpel et al. |
| 2018/0057748 A1 | 3/2018 | Hochstetter et al. |
| 2018/0124874 A1 | 5/2018 | Dardona et al. |
| 2018/0127081 A1 | 5/2018 | Zquez et al. |
| 2018/0176989 A1 | 6/2018 | Hu et al. |

FOREIGN PATENT DOCUMENTS

| | | |
|---|---|---|
| EP | 3015360 A1 | 5/2016 |
| EP | 3095690 A2 | 11/2016 |
| EP | 3339013 A1 | 6/2018 |
| GB | 1444718 A | 8/1976 |
| JP | H0732518 A | 2/1995 |
| JP | 4862913 B2 | 1/2012 |
| WO | 2012087294 A1 | 6/2012 |

OTHER PUBLICATIONS

Extended European Search Report issued during the prosecution of European Patent Application No. 19183891.1 dated Nov. 4, 2019. (7 pages).

Extended European Search Report issued during the prosecution of European Patent Application No. 19184091.7 dated Nov. 28, 2019. (6 pages).

Extended European Search Report issued during the prosecution of European Patent Application No. 19182513.2 dated Nov. 28, 2019. (6 pages).

Extended European Search Report for EP Application No. 19183876. 2, dated Oct. 25, 2019, pp. 5.

\* cited by examiner

HEATED FLOOR PANELS

BACKGROUND OF THE INVENTION

1. Field of the Invention

The present disclosure relates to heated panels, and more particularly to heated floor panels such in aircraft.

2. Description of Related Art

Positive thermal coefficient (PTC) materials increase in electrical resistance as their temperature rises. PTC materials are useful in heating panels such as used in heating aircraft floors, due to their intrinsic limits on temperature. Carbon-based PTC heaters for aircraft floor panels are traditionally fabricated by screen printing a PTC-based ink in a desired heating element pattern as a layer in a series of layers making up the panel. Screen printing requires preparation of the screen, and an excess amount of ink is required for the screen printing process, i.e. more ink must go into the process than actually ends up in the floor panel. The balance of the ink used in the process must be disposed of.

Aircraft floor panels are subject to a wide variety of impacts from dropped objects both sharp and blunt in nature. A floor panel must also be resistant to knife cuts as part of installation and maintenance of the floor panel. A floor panel's ability to withstand both impact and knife cuts is important for promoting a robust floor panel. Traditional surface layer materials used in composite panels are usually unable to withstand repeated or high load impacts as well as knife cuts.

The conventional techniques have been considered satisfactory for their intended purpose. However, there is an ever present need for improved heated panels and process for making the same. This disclosure provides a solution for this need.

SUMMARY OF THE INVENTION

A heater panel includes a core and a heater/dielectric layer including a positive thermal coefficient (PTC) heater layer between a pair of dielectric layers. A structural facing is included, wherein the heater/dielectric layer is bonded directly between the core and the structural facing.

The core can include at least one of a honeycomb structure and/or a foam material. The structural facing can be a first structural facing, and a second structural facing can be bonded to the core opposite the heater/dielectric layer. The first structural facing and the second structural facing can each include carbon fiber impregnated with a resin, wherein the resin includes at least one of a thermoplastic material and/or a thermoset material.

An impact layer can be bonded to the structural facing, e.g., the first structural facing described above, opposite the heater/dielectric layer. The impact layer can include at least one of a monolithic metal, a monolithic polymer, a resin-impregnated metal, and/or a resin-impregnated polymer fabric. The heater/dielectric layer can be bonded directly to the core without any intervening layers aside from an adhesive or bonding agent, and the heater/dielectric layer can be bonded directly to the structural facing without any intervening layers aside from an adhesive or bonding agent A method of making a heater panel includes bonding a heater/dielectric layer that includes a PTC heater layer to a core. The method includes bonding a structural facing directly to the heater/dielectric layer opposite the core so the heater/dielectric layer is bonded directly between the core and the structural facing.

The structural facing can be a first structural facing, and the method can include bonding a second structural facing to the core opposite the heater/dielectric layer. The method can include bonding an impact layer to the structural facing opposite the heater/dielectric layer.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
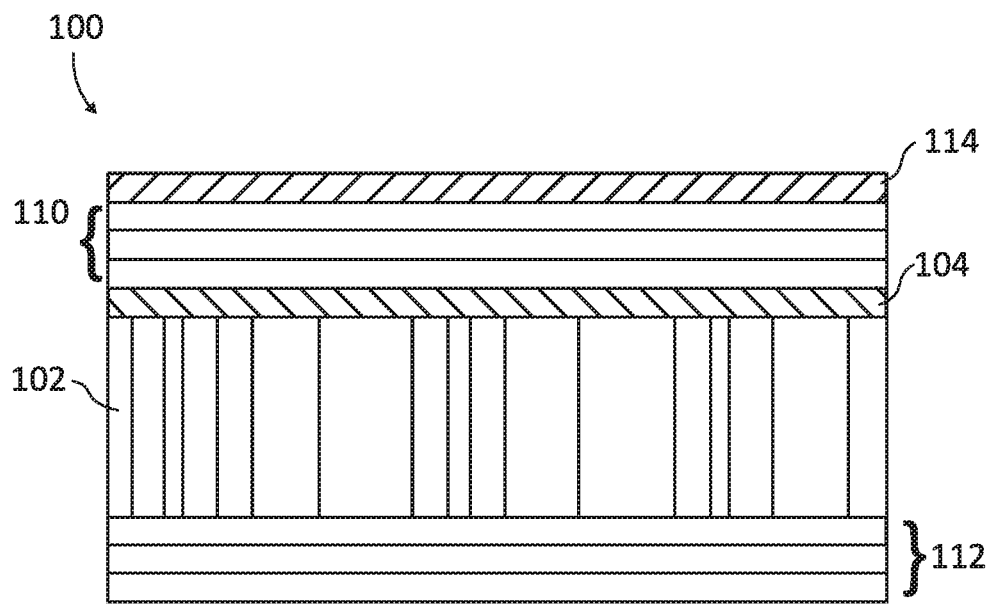
FIG. 1 is a schematic cross-sectional view of an exemplary embodiment of a heater panel constructed in accordance with the present disclosure, showing the heater/dielectric layer between the core and the first structural facing.

Reference will now be made to the drawings wherein like reference numerals identify similar structural features or aspects of the subject disclosure. For purposes of explanation and illustration, and not limitation, a partial view of an exemplary embodiment of a heater panel in accordance with the disclosure is shown in FIG. 1 and is designated generally by reference character 100. Other embodiments of heater panels in accordance with the disclosure, or aspects thereof, are provided in FIGS. 2-3, as will be described. The systems and methods described herein can be used to provide heater panels, e.g., for aircraft floors and other surfaces including contoured surfaces.

Figure 2:
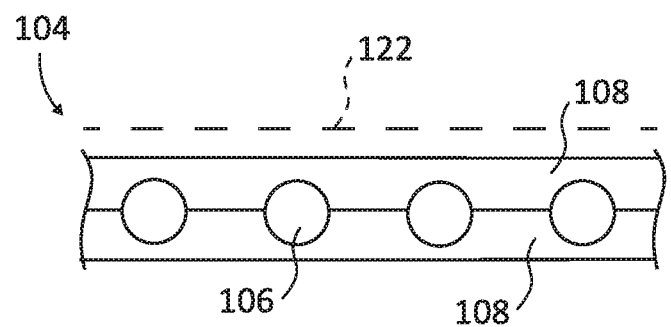
FIG. 2 is a schematic cross-sectional view of the heater/dielectric layer of FIG. 1, showing the dielectric layers.
Figure 3:
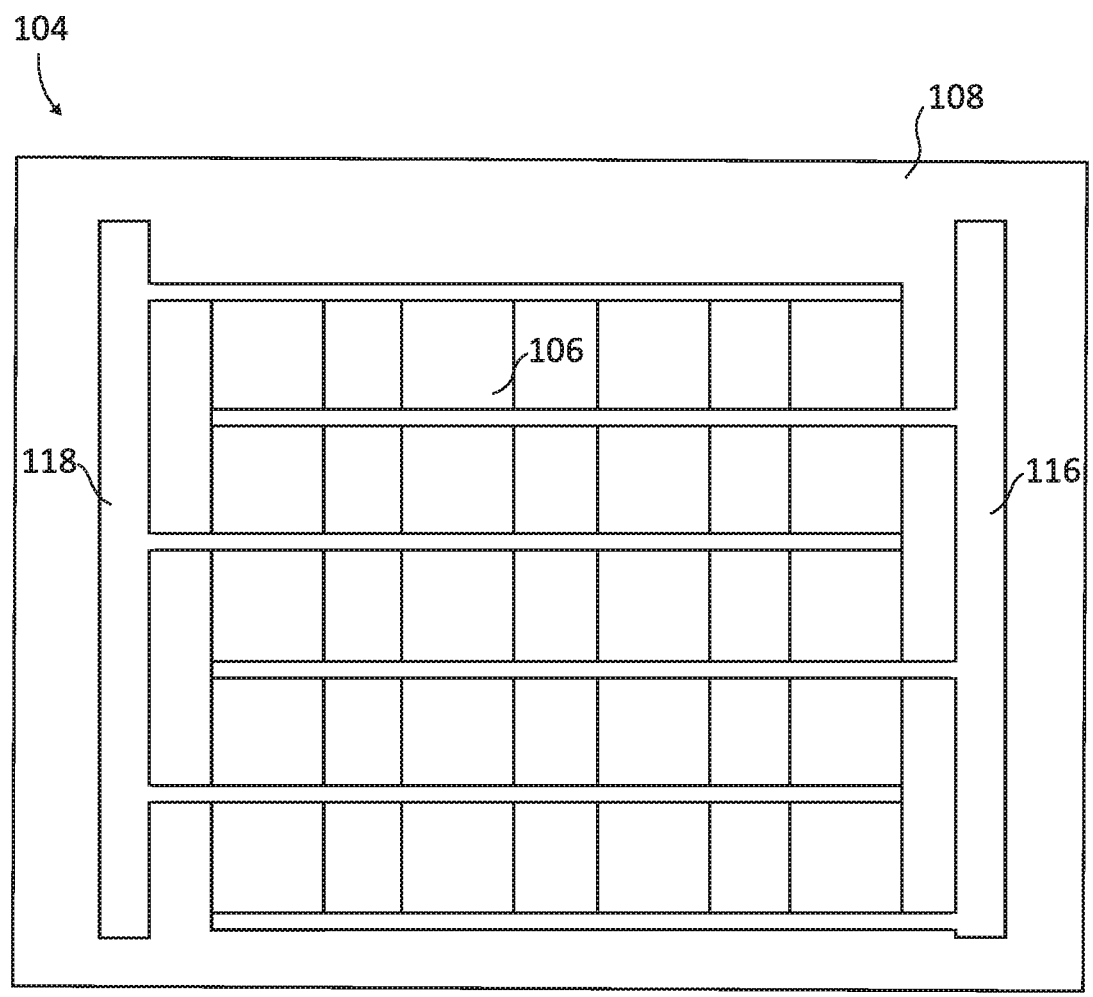
FIG. 3 is a schematic planar view of a portion of the heater panel of FIG. 1, showing the heater element pattern of the heater/dielectric layer.

The heater panel 100 includes a core 102 and a heater/dielectric layer 104. The core 102 includes at least one of a honeycomb structure and/or a foam material. As shown in FIG. 2, the heater/dielectric layer 104 is an assembly that includes a positive thermal coefficient (PTC) heater layer 106 between a pair of dielectric layers 108. FIG. 3 shows an exemplary heating element pattern for the PTC heater layer 106, which has multiple redundant electrical pathways for current to flow from one bus bar 116 to the other bus bar 118.

Referring again to FIG. 1, a first structural facing 110 is included, wherein the heater/dielectric layer 104 is bonded directly between the core 102 and the first structural facing 110, e.g., with no intervening layers aside from an adhesive or bonding agent. A second structural facing 112 is bonded to the core 102 opposite the heater/dielectric layer 104. The first structural facing 110 and the second structural facing 112 each include carbon fiber impregnated with a resin, wherein the resin includes at least one of a thermoplastic material (such as PEEK, PC, PPS, and PEI) and/or a thermoset material (such as epoxy, phenolic, bis-maleimide resins (BMI), and benzoxazine).

An impact layer 114 is bonded to the first structural facing 110 opposite the heater/dielectric layer 104. The impact layer 114 includes at least one of a monolithic metal such as aluminum or titanium, a monolithic polymer, a resin-impregnated metal, and/or a resin-impregnated polymer fabric. Suitable monolithic polymer materials include thermoplastics such as polyetheretherketone, polyaryletherketones, polycarbonate, polyphenylene sulfide, polyetherimide, polyimide, polymethylmethacrylate (acrylic), polyvinylchloride, polyurethane, polyamideimide and thermoset materials such as epoxy, phenolic, BMI, benzoxazine, and polyurethane. The foregoing polymers can be mixed, and can have reinforcement such as aramids (such as Kevlar fibers and Nomex fibers available from DuPont of Wilmington, Del.), fiberglass, basalt, carbon fiber, carbon nanotube, nano steel, steel wire, and titanium wire. Any of the foregoing polymers can be impregnated into the reinforcements assuming temperature compatibility.

A method of making a heater panel, e.g., heater panel 100, includes bonding a heater/dielectric layer, e.g., heater/dielectric layer 104, that includes a PTC heater layer, e.g., PTC heater layer 106, to directly to a core, e.g., core 102. The method includes bonding a structural facing, e.g., structural facing 110, directly to the heater/dielectric layer opposite the core so the heater/dielectric layer is bonded directly between the core and the structural facing.

The method includes bonding a second structural facing, e.g., second structural facing 112, to the core opposite the heater/dielectric layer. The method includes bonding an impact layer, e.g., impact layer 114, to the first structural facing opposite the heater/dielectric layer.

As shown in FIG. 2, with the heater element pattern, there are places in the heater/dielectric layer 104 where the dielectric layers 108 directly contact one another, and other places where the actual heater element of the PTC heater layer 106 is sandwiched between the dielectric layers 108. Those skilled in the art will readily appreciate that heater element pattern shown in FIG. 3 is exemplary only, and that any other suitable pattern can be used without departing from the scope of this disclosure. Other layers such as the impact layer 114 and the second structural facing 112 can be bonded to the respective surfaces of the heater panel 100 as required using film adhesives or the like.

The methods and systems of the present disclosure, as described above and shown in the drawings, provide for heater with superior properties relative to traditional heater panels including lighter weight, longer life, improved thermal efficiency, and improved robustness. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A heater panel comprising:
   a core;
   a heater/dielectric layer including a positive thermal coefficient (PTC) heater layer between a pair of dielectric layers; and
   a structural facing, wherein the heater/dielectric layer is bonded directly between the core and the structural facing, wherein the heater/dielectric layer is bonded directly to the core without any intervening layers aside from an adhesive or bonding agent, and wherein the heater/dielectric layer is bonded directly to the structural facing without any intervening layers aside from an adhesive or bonding agent.

2. The heater panel as recited in claim 1, wherein the core includes at least one of a honeycomb structure and/or a foam material.

3. The heater panel as recited in claim 1, wherein the structural facing is a first structural facing, and further comprising a second structural facing bonded to the core opposite the heater/dielectric layer.

4. The heater panel as recited in claim 3, wherein the first structural facing and the second structural facing each include carbon fiber impregnated with a resin, wherein the resin includes at least one of a thermoplastic material and/or a thermoset material.

5. The heater panel as recited in claim 1, further comprising an impact layer bonded to the structural facing opposite the heater/dielectric layer.

6. The heater panel as recited in claim 5, wherein the impact layer includes at least one of a monolithic metal, a monolithic polymer, a resin-impregnated metal, and/or a resin-impregnated polymer fabric.

7. The heater panel as recited in claim 1, wherein the structural facing is a first structural facing and further comprising:
   a second structural facing bonded to the core opposite the heater/dielectric layer; and
   an impact layer bonded to the first structural facing opposite the heater/dielectric layer.

8. A method of making a heater panel comprising:
   bonding a heater/dielectric layer that includes a PTC heater layer 4e-directly to a core;
   bonding a structural facing directly to the heater/dielectric layer opposite the core so the heater/dielectric layer is bonded directly between the core and the structural facing, wherein bonding the heater/dielectric layer directly to the core includes bonding directly without any intervening layers aside from an adhesive or bonding agent, and wherein bonding the structural facing directly to the heater/dielectric layer directly includes bonding without any intervening layers aside from an adhesive or bonding agent.

9. The method as recited in claim 8, wherein the core includes at least one of a honeycomb structure and/or a foam material.

10. The method as recited in claim 8, wherein the structural facing is a first structural facing, and further comprising bonding a second structural facing to the core opposite the heater/dielectric layer.

11. The method as recited in claim 10, wherein the first structural facing and the second structural facing each include carbon fiber impregnated with a resin, wherein the resin includes at least one of a thermoplastic material and/or a thermoset material.

12. The method as recited in claim 8, further comprising bonding an impact layer to the structural facing opposite the heater/dielectric layer.

13. The method as recited in claim 12, wherein the impact layer includes at least one of a monolithic metal, a monolithic polymer, a resin-impregnated metal, and/or a resin-impregnated polymer fabric.

* * * * *